W. W. WALLACE.

Assignor to THE WALLACE MANUFACTURING COMPANY.

CLAY CRUSHING MACHINE.

No. 10,584. Reissued Apr. 21, 1885.

Attest

Joseph H. Sims

M. E. Millican

Inventor

William W. Wallace by Wood & Boyd his Attorneys &c

N. PETERS, Photo-Lithographer, Washington, D. C.

UNITED STATES PATENT OFFICE.

WILLIAM W. WALLACE, OF FRANKFORT, INDIANA, ASSIGNOR TO THE WALLACE MANUFACTURING COMPANY, OF SAME PLACE.

CLAY-CRUSHING MACHINE.

SPECIFICATION forming part of Reissued Letters Patent No. 10,584, dated April 21, 1885.

Original No. 309,174, dated December 9, 1884. Application for reissue filed March 25, 1885.

*To all whom it may concern:*

Be it known that I, WILLIAM W. WALLACE, a citizen of the United States, and a resident of Frankfort, in the county of Clinton and State of Indiana, have invented certain new and useful Improvements in Clay-Crushing Machines, of which the following is a specification.

My invention relates to an improved machine for crushing clay.

The object of my invention is to provide a machine which will at once crush the clay, which is carried through the crushers vertically, but will remove the stones laterally over the face of the crushers, all of which will be fully set forth in the description of the accompanying drawings.

Figure 1:
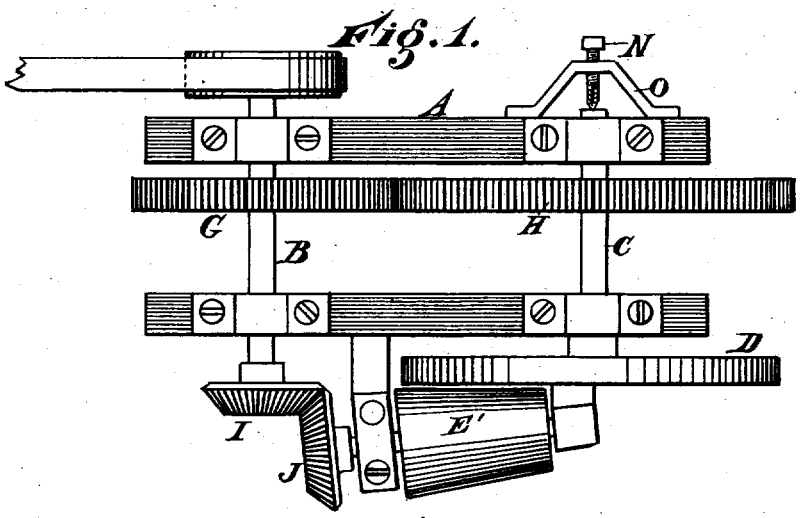
Figure 2:
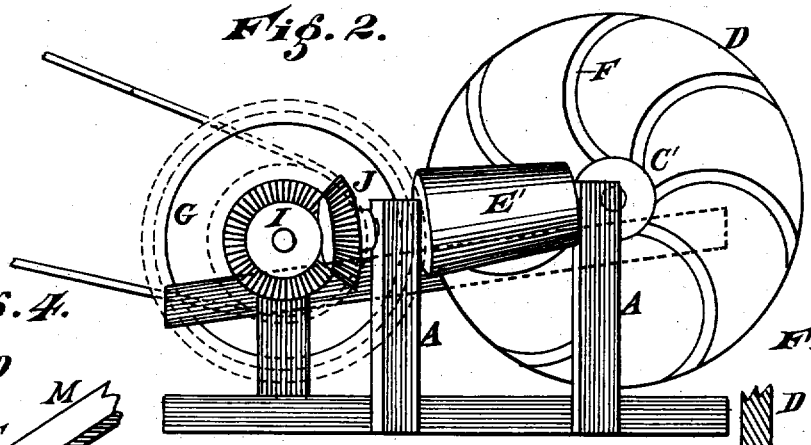
Figure 4:
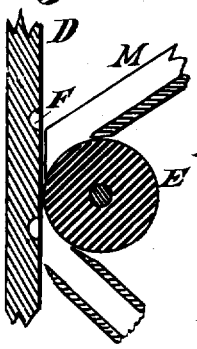
Figure 5:
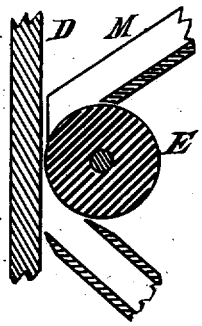
Figure 3:
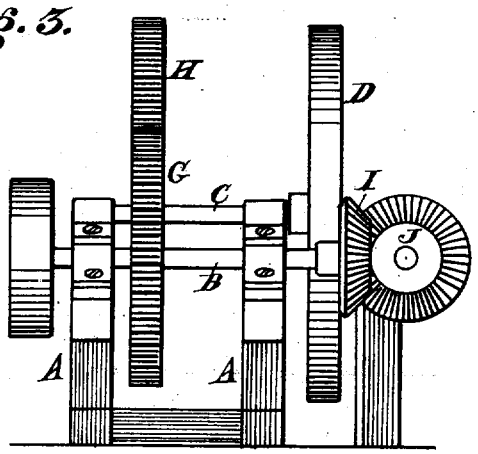

Figure 1 represents a plan view of my improvement; Fig. 2, a side elevation thereof; Fig. 3, an end elevation; Fig. 4, a broken sectional elevation showing the relative position of the grinding roller and disk. Fig. 5 is a similar section showing a modification of the disk and roller.

A represents the frame of the machine. The parts should be substantially built, so as to resist the strain of the crushing devices.

B represents the main driving-shaft.

C is a shaft carrying a vertical crushing-disk, D.

E is a crushing-roll, preferably made tapering, or in the form of a frustum of a cone. It is mounted upon a shaft journaled to the frame A so that its periphery will be parallel to the face of disk D.

J represents a beveled gear keyed upon the shaft of roll E, meshing with bevel I, keyed upon the driving-shaft B.

G represents a spur-gear secured to shaft B, and meshing with gear H on shaft C, which drives disk D.

F represents spiral grooves cut in the face of disk D. These grooves are shown of a spiral form; but they may be made straight and tangential to the periphery of the circle C′, which represents the boundary-line of the abutment of the inner end of the taper crushing-roll E against the face of disk D.

It will be seen that the taper roll E and the disk D receive their motion from shaft B, so that the periphery of the roll E will come in contact with the face of disk D.

A suitable hopper, M, is provided for feeding the clay in between the roll E and disk D. It will be crushed between the smooth face of disk D and the periphery of roll E. Should stones or other similar substances be in the clay, they would be caught by the grooves F and forced outward and discharged laterally from the outer periphery of the disk, a sufficient distance between the edge of disk D and frame A being provided for that purpose.

O represents a bridge-tree, and N an adjusting-screw, which bears against the center of shaft C, for adjusting the face of disk D to the periphery of roll E, to regulate the fineness of the crushing.

A modification of my invention is shown in Fig. 5, which represents the face of disk D as smooth without the spiral grooves. The stones in this case will be worked out laterally in the same direction as before stated between the faces of disk D and roller E.

A still further modification of my invention may be made by making roll E cylindrical instead of conical. The grooves F (in this case) in the face of the disk would carry out the stones in the same manner as before stated; but the preferred form of my invention is shown in Figs. 1, 2, 3, and 4; or the grooves F might also be omitted and a straight roll used with a plain disk, and such a machine would embody the features of the first clause of claim herein.

What I claim is—

1. A clay-crushing machine consisting, substantially, of the vertical disk D and horizontal roll E, driven by suitable gearings from the main shaft, and adapted to crush the clay and carry it through vertically between the faces of said crushing parts and discharge the stones laterally over the face of the grinding devices, substantially as described.

2. A clay-crushing machine consisting, substantially, of the vertical disk D, having radial grooves, and horizontal roll E, driven by suitable gearings from the main shaft, and adapted to crush the clay and carry it through vertically between the faces of said crushing parts and discharge the stones laterally across the faces of the grinding devices, substantially as described.

3. A clay-crushing machine consisting, substantially, of the vertical disk D and horizontal taper roll E, said disk being provided with radial grooves F, and driven by suitable gearing from the main shaft, and adapted to crush the clay and carry it through vertically between the faces of said crushing parts and discharge the stones laterally over the face of the grinding devices, substantially as described.

4. A clay-crushing machine consisting, substantially, of the vertical disk D, provided with radial grooves F, and taper roll E, and driven by suitable gearing on the main shaft, and adapted to crush the clay and convey it through vertically between the faces of said crushing parts and discharge the stones laterally over the face of the grinding devices, substantially as described.

In testimony whereof I have hereunto set my hand.

WILLIAM W. WALLACE.

In presence of—
S. C. BORHER,
ELI MARVIN.